Sept. 15, 1970        P. I. TROTTER        3,528,815
METHOD FOR PROCESSING CEREAL GRAIN
Filed May 4, 1967        8 Sheets-Sheet 1
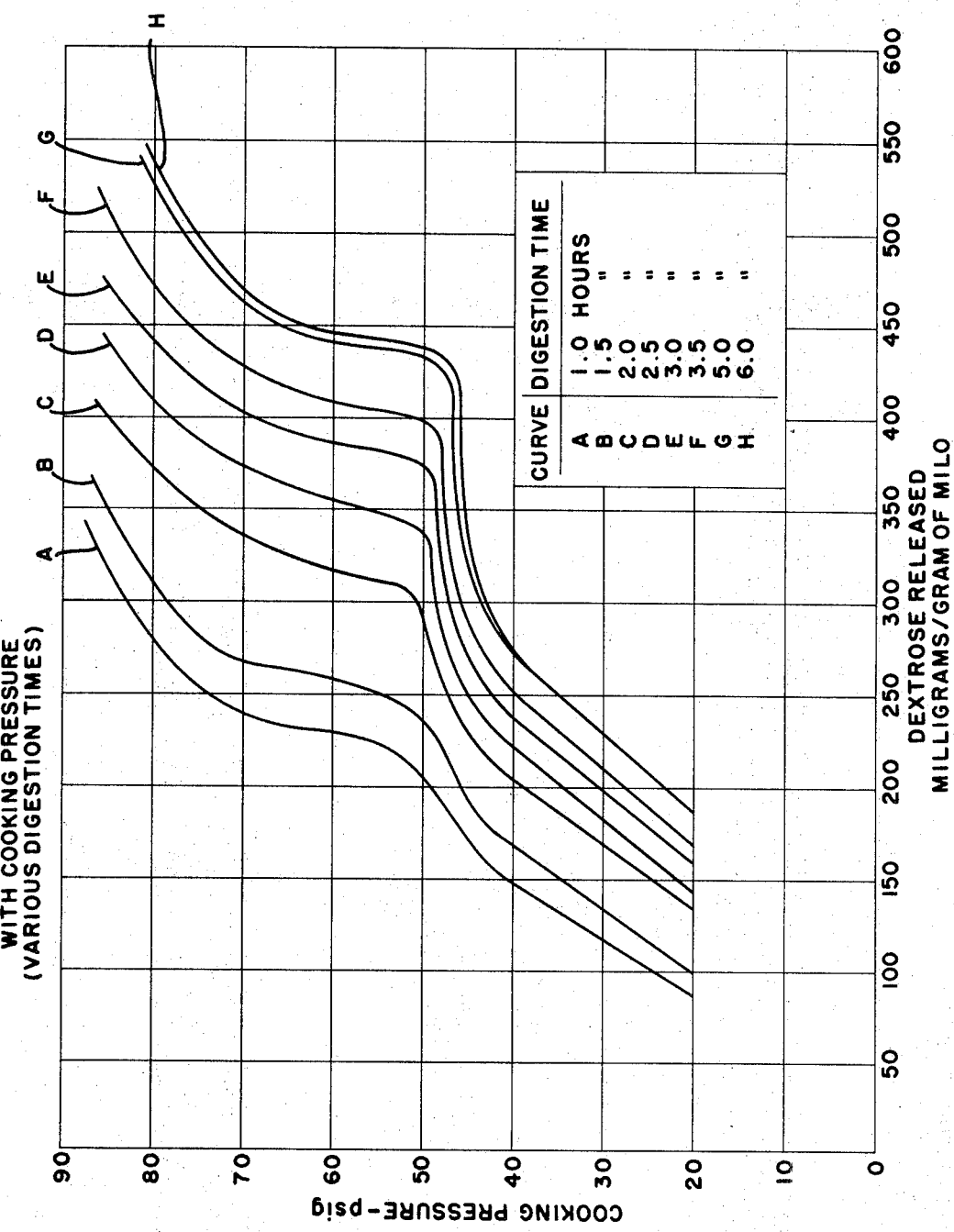
FIG_1
INVENTOR.
PETER I. TROTTER
BY
*Francis W. Anderson*
ATTORNEY

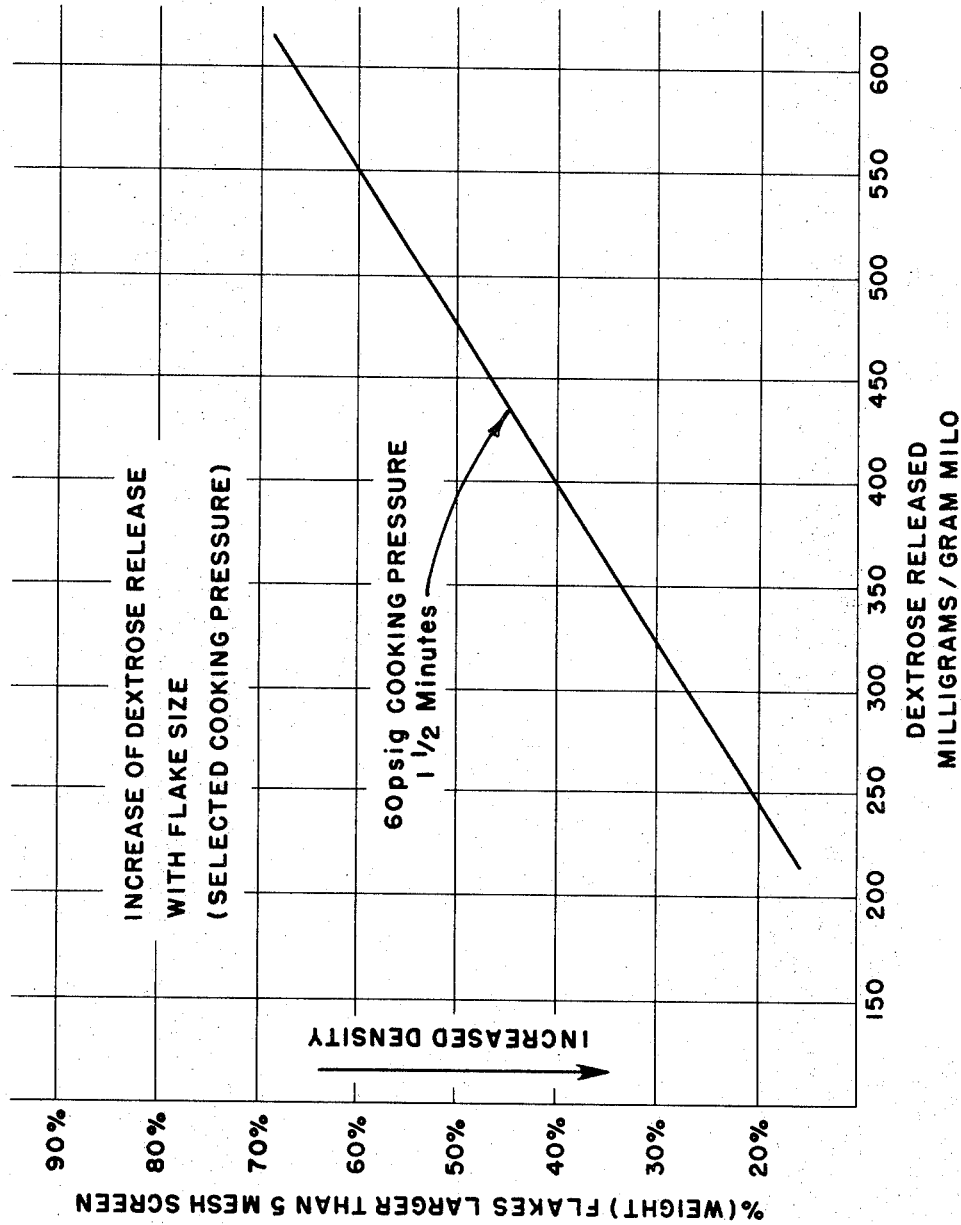

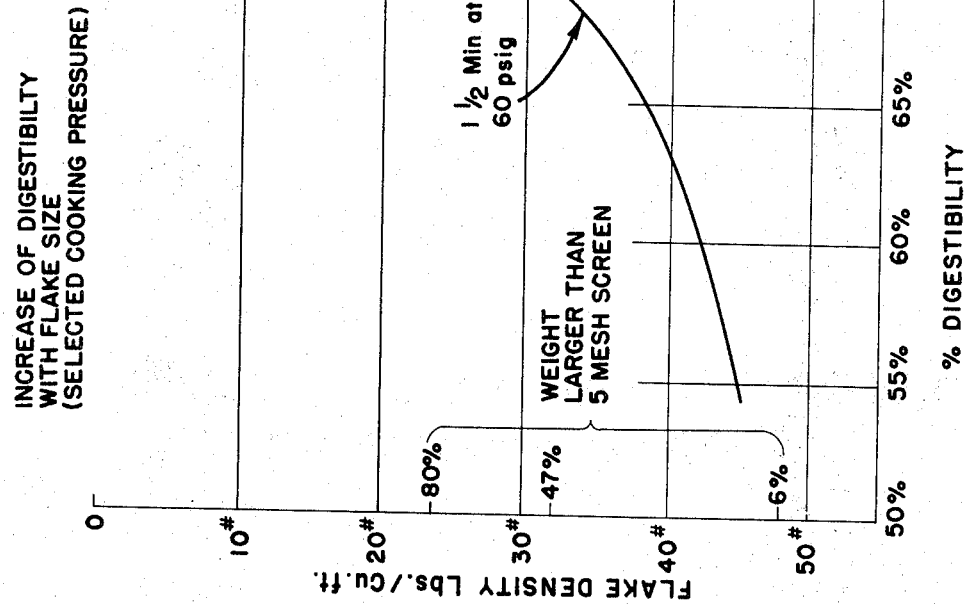
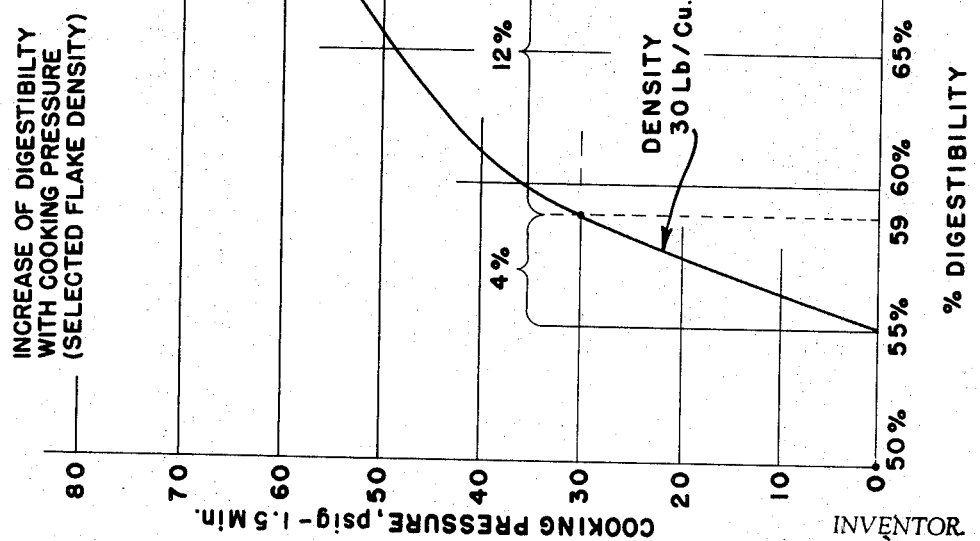

Sept. 15, 1970  P. I. TROTTER  3,528,815
METHOD FOR PROCESSING CEREAL GRAIN
Filed May 4, 1967  8 Sheets-Sheet 4
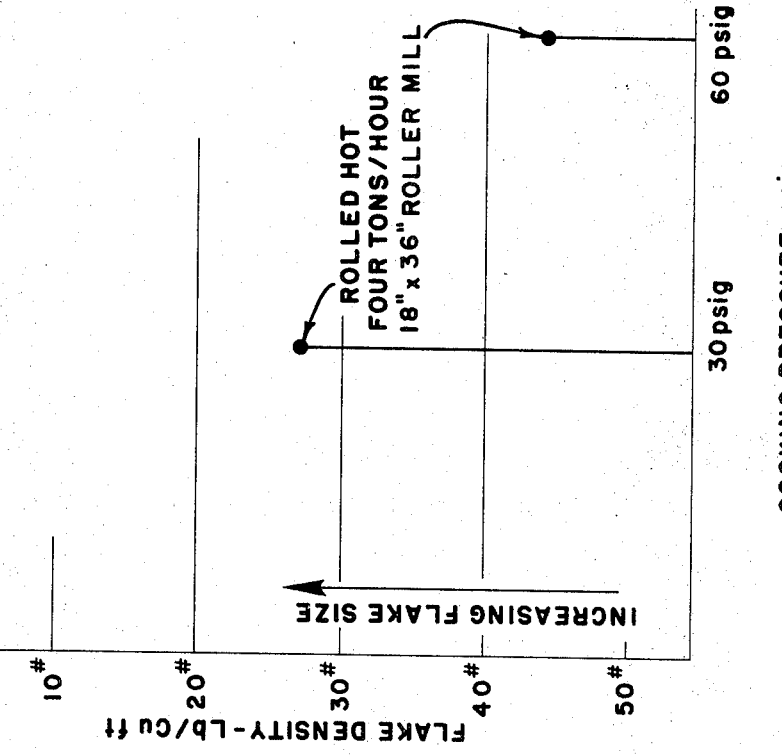
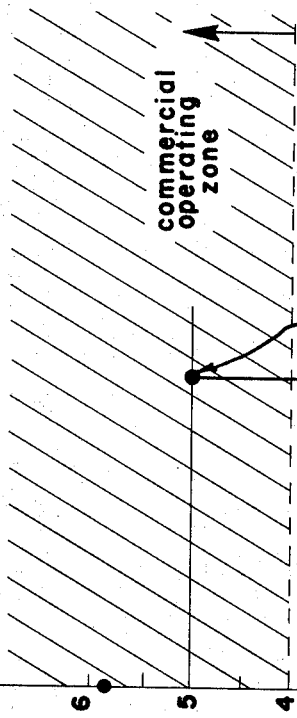
INVENTOR.
PETER I. TROTTER
BY
Francis W. Anderson
ATTORNEY

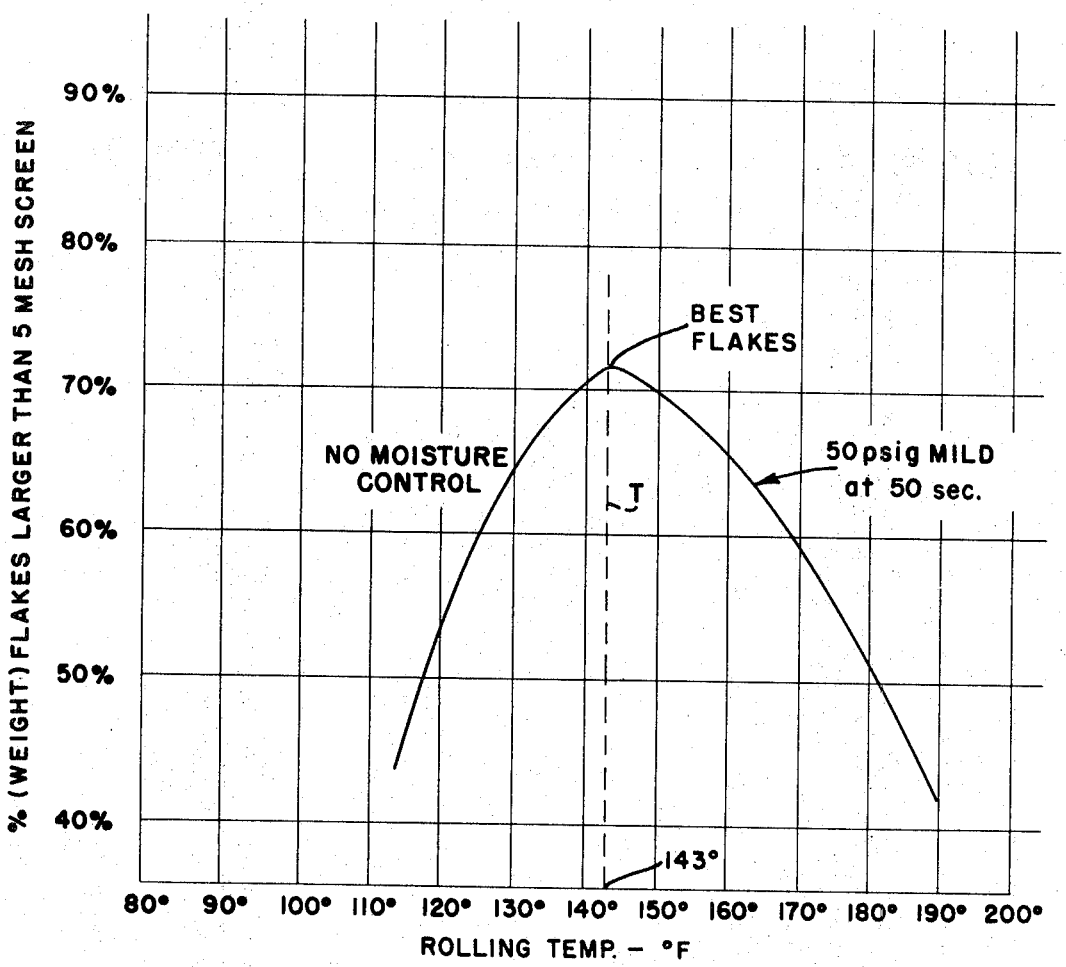

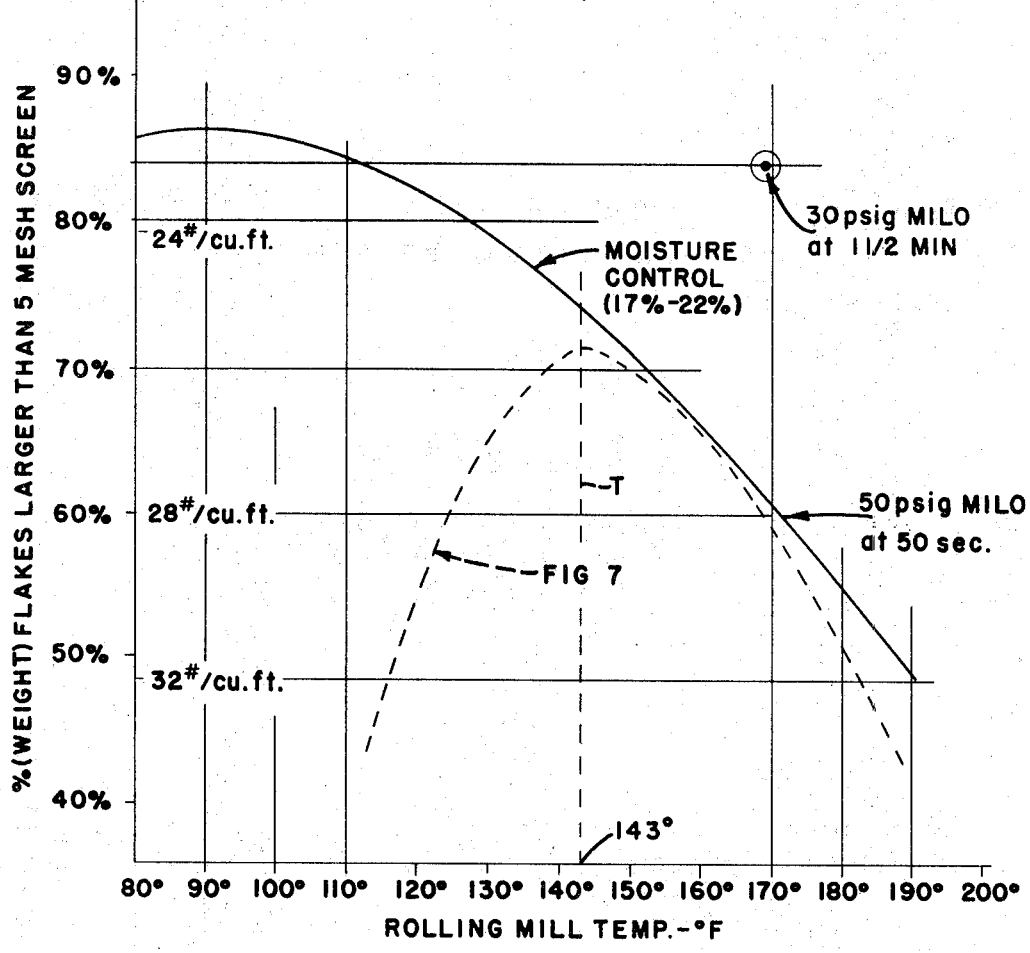

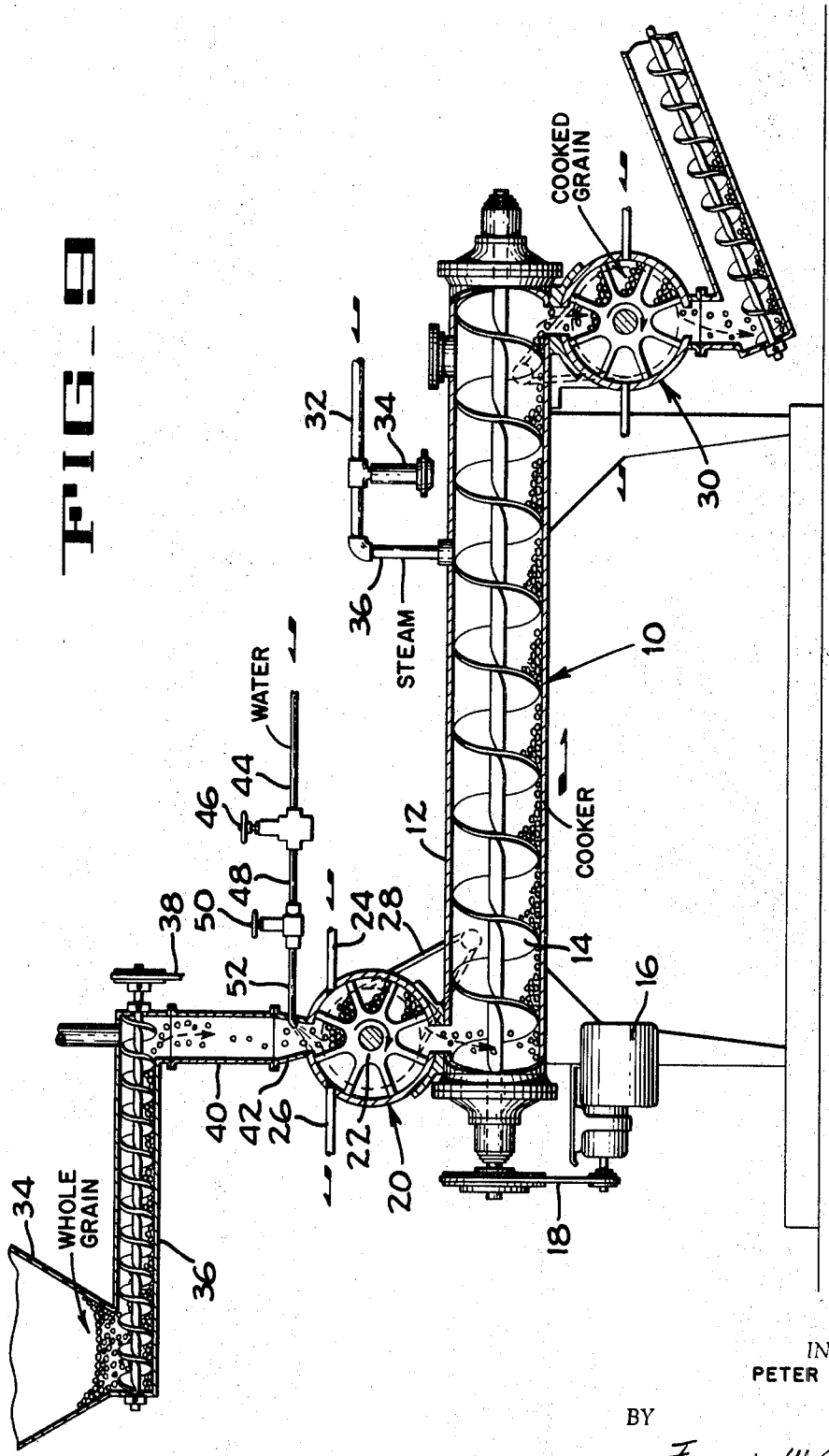

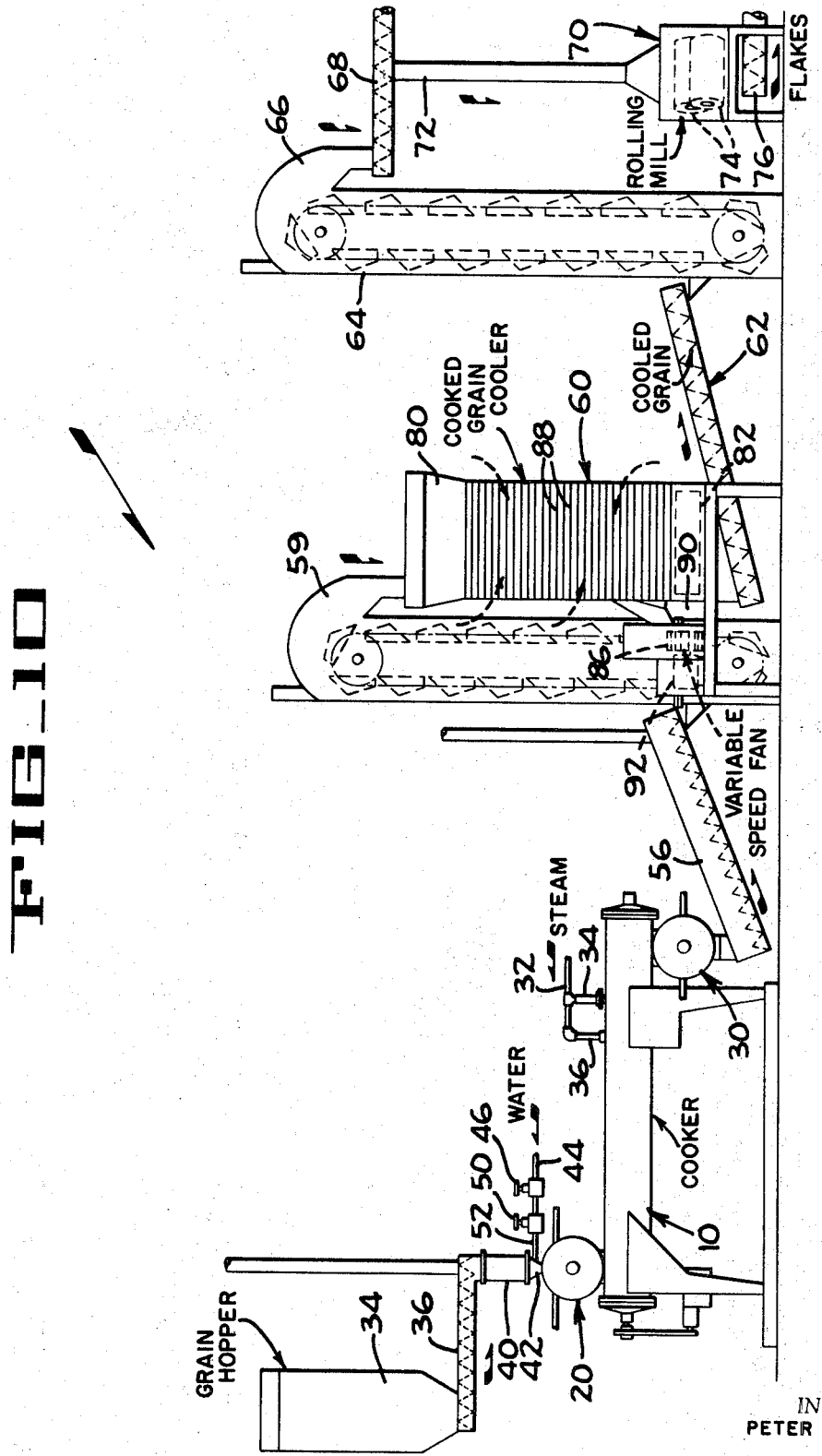

United States Patent Office 3,528,815
Patented Sept. 15, 1970

3,528,815
METHOD FOR PROCESSING CEREAL GRAIN
Peter I. Trotter, Palo Alto, Calif., assignor to FMC Corporation, San Jose, Calif., a corporation of Delaware
Filed May 4, 1967, Ser. No. 636,087
Int. Cl. A23k 1/00
U.S. Cl. 99—2          3 Claims

ABSTRACT OF THE DISCLOSURE

Whole raw milo at normal moisture content is prepared for animal feed by steaming the grain in a continuous cooker at 40 p.s.i.g. or higher, cooling the grain in the range of from 143 degrees F. to 90 degrees F. with the latter temperature preferred, adding water to the whole grain before steaming to bring the moisture content of the cooled grain at the rolls to about 17 percent to 22 percent by weight, and rolling the grain to provide low density flakes.

REFERENCE TO RELATED APPLICATION

This invention is an improvement over the application of Frank D. Hickey, Ser. No. 448,568, filed Apr. 8, 1965, now Pat. 3,336,137, Aug. 15, 1967, and assigned to the FMC Corporation, which application claims steaming grain for dextrose release at 40 to 100 p.s.i.g.

This invention is also an improvement over the application of Katsuji Hirahara, Ser. No. 445,912, filed Apr. 6, 1965, now Pat. 3,471,298, Oct. 7, 1969, and assigned to the FMC Corporation, which application claims cooling the grain before rolling but without the addition of water to the uncooked grain.

This invention relates in general subject matter to the application of Frank D. Hickey, Ser. No. 569,361, filed Aug. 1, 1966, now Pat. 3,342,607, Sept. 19, 1967, and assigned to the FMC Corporation, which application claims drying and reconstituting grain processed in accordance with the earlier Hickey application.

BRIEF SUMMARY OF THE INVENTION

The rolling of steamed kernel grains, such as corn or milo, which have been cooked at low pressures, now presents no problem insofar as a provision of a large flake, low density product is concerned. Providing the grain is not too hot and moist, a commercially accepted rolling tonnage per hour is attainable without excessive power consumption when rolling steamed milo or the like.

Frank D. Hickey (Ser. No. 448,568, referred to above), found that enzymatic-conversion of dextrose, that is, dextrose released from the grain, is increased unexpectedly by cooking the grain at pressures of 40 p.s.i.g. or higher, the preferred pressures being at least 50 or 60 p.s.i.g. minimum. It was also found that the cooking time could be as short as 50 seconds to one minute, and yet an important nutritional benefication of the grain would be provided.

However, later work with the benefication of grain such as milo, in accordance with the Hickey invention, showed that large scale processing of grain cooked at 40 p.s.i.g. or higher, in order to achieve the above-mentioned nutritional advantages, presented commercial and practical problems not directly related to the actual feed value of the product. If the product is too wet, and particularly if it is hot, the product forms sheets and jams the rolls. If the product is driven, so that there is no sheeting, it may be difficult to flake. For example, the milo kernels may merely flatten out and spring back to their original shape after having passed through the gap between the rolls. This produces small, high density flakes and fails to properly expose the starch within the hull for digestive attack. The hulls of corn are even tougher than those of milo so that processing corn at high pressures presents a similar problem.

In other cases, excessive fines and pulverization result, with attendant reduction in potential feed value. Grain processed at 40 p.s.i.g. or higher can usually be flaked by rolling it slowly so that light density flakes with exposed starch are produced. However, under these conditions the rolling rate is so low was to present problems in the economics of a large tonnage feeding operation. Thus, cattle feeders faced with large tonnage requirements have often reverted to atmospheric or low pressure steaming, namely, steaming at 30 p.s.i.g. or lower, in order to produce the requisite high tonnage of good appearing flakes. Under these conditions, the benefication of the nutritional value of the grain under the Hickey invention is not realized, because of practical milling criteria.

In order to obtain the benefication of the Hickey process in large scale feed mill operation, it was decided to cool the cooked grain before rolling, as described in the aforesaid Hirahara application, Ser. No. 445,912. Although this helped matters and facilitated the production of better flakes, the production of fines occurs at temperatures around 145 degrees and increases with further cooling. There was a lower limit to the cooling process (at 120 to 130 degrees F.) below which temperatures the grain tended to pulverize unacceptably, instead of flaking. The beneficial effects of cooling were believed to be there but were unattainable at commercial rolling rates because of the flaking problems presented, so that even within the limited cooling range available, the tonnage output and power consumption were not satisfactory.

Under the present invention, all of the benefication of the grain inherent in the Hickey process is attainable and under commercially acceptable conditions, by the introduction of two simple control elements in the overall process before the actual rolling step. Evaluation of the unsatisfactory results of attempting to improve the process commercially solely by cooling the grain before rolling led to the hypothesis that cooling caused a deleterious release of water from the interior of the cooked grain to an extent that reduced the homogenous plastic nature of the grain, so that the cooked and cooled grain would not flatten but would tend to break up and pulverize during rolling. Based on this assumption, it was conceived that the addition of water to the grain before rolling the grain in a cooled condition would result in a larger, less dense flake and preclude breaking up of the grain during rolling.

However, it was found that the mere random addition of water to the grain after the cooking process and before rolling would result in what appeared to be an unequal moisture gradient throughout the kernels. Although the outer hull of the grain provided with additional moisture might be elastic enough to flatten and possibly break and expose the interior starch as desired, the starch itself would still be unacceptably dry and the center portions of the grain would break and pulverize thereby spoiling the flake and increasing the over-all density of the product. As a matter of fact, the conditions just described are quite the reverse of the ideal, which would be one wherein the hull is dry so as to readily break and expose the starch with the latter being in a moist, plastic body throughout to provide a flat flake of exposed starch. The problem, then, was to provide cooked grain, cooled for rolling, bearing an adequate quantity of water in the center of the starch without unduly weakening and softening the hull.

All of these problems were solved, in accordance with the present invention by introducing a selected amount of additional moisture into the grain, and by doing so in a manner which caused the moisture to be driven into the center of the grain. Preferably, the additional or control moisture thus introduced is added to the grain just before it is introduced into the cooker so that the additional moisture is driven into the grain at the high pressure and temperature of the cooker. The expansion of the milo during the cooking operation even facilitates penetration of the additional moisture right through to the center of the starch bodies. With this type addition of moisture to the grain, it has been found that when cooling is used to obtain the benefication of the Hickey process and other advantages, it is only necessary to adjust the rate of water addition to permit commercial rolling of excellent flakes even at 90 degrees F. or lower. The introduction of grain having excessive moisture to the rolls is readily apparent to those skilled in operating rolling mills of this type because grain that is too wet to roll becomes gummy and forms a plastic sheet instead of flakes and, in fact, will even stop the rolls of the mill. A condition that is more commonly encountered in rolling cooled grain without adding moisture in accordance with the present invention is that poor flakes are provided and that the grain springs back or pulverizes. This is apparent from examination of the flakes emerging from the rollers. Thus, and in accordance with the present invention, a small adjustment of the rate of water addition to the grain just before it is introduced into its steam cooker is all that is required. This will ordinarily permit cooling, down from about 143 degrees, which provides a minimum benefication under the present invention to 90 degrees F. or to ambient temperature, with optimum flake and nutritional conditions occurring at about 90 degrees F. Normally, the grain will not be cooled below 90 degrees F., but it can be. Although the introduction to moisture under the present invention does give the mill operator a choice of cooling temperatures, if for a selected cooling temperature the operator observes that the grain is too dry when it is being rolled (as evidenced by pulverizing and excessive fines) it is a simple matter to merely increase the rate of moisture addition ahead of the cooker until the flakes will come out large and flat at the selected cooled temperature.

DESCRIPTION OF THE DRAWINGS

FIG. 1 is a family of curves showing the increase of dextrose release with cooking pressure.

FIG. 2 is a curve showing the increase of dextrose release with flake size.

FIG. 3 is a curve showing the increase of digestability with cooking pressure.

FIG. 4 is a curve showing the increase of digestability with flake size.

FIG. 5 is a curve showing the decrease in rolling tonnage with cooking pressure.

FIG. 6 is a curve showing the decrease of flake size with cooking pressure.

FIG. 7 is a curve showing the effect of cooling the cooked grain on flake size without moisture control.

FIG. 8 shows how moisture control and cooling result in a superior product.

FIG. 9 shows a cooker modified for practicing the present invention.

FIG. 10 is a diagram of a complete mill for practicing the present invention.

DETAILED DESCRIPTION OF THE INVENTION

FIG. 1 is a family of curves taken from the aforesaid application of Hickey, Ser. No. 448,568. These curves show the increase of dextrose release with cooking pressure at various digestion times. As explained and claimed in the aforesaid Hickey application, there is an unexpected and significant increase in dextrose release from milo (and other grains) at a cooling pressure of 40 p.s.i.g. or higher. It will also be noted that the benefication due to the increased cooking pressure is quite significant in the range of 50 to 60 p.s.i.g Cattle feeding tests have been conducted which relate the dextrose release with flake size, it being understood that in this art there is an inverse relation between flake size and the bulk density of the flakes, although the relation is not linear. FIG. 2 shows the increase of dextrose release with flake size at a selected cooking pressure, namely 60 p.s.i.g. cooking pressure for 1½ minutes. The ordinate of FIG. 2 gives flake size in terms of the percent of flakes by weight larger than a 5 mesh screen. (A five mesh screen has apertures 0.157 inch across.) The curve of FIG. 2 shows a regular gain in dextrose release with increased flake size, or conversely with a decrease in the bulk density of the flakes.

The curve of FIG. 3 relates cooking pressure with percent digestability. Although the action caused by cooking (FIG. 1) which increases dextrose release also produces a product having an increased percent digestability, the latter property of the grain is not exclusively determined by dextrose release, and hence the curves of FIGS. 1 and 3 are not identical in shape. Nevertheless, FIG. 3 shows how the same increase in cooking pressures made in accordance with the Hickey invention shown in FIG. 1, also provides an accelerated increase in the percent of digestability of the cooked product. "Digestability" is an animal function and hence is not subject to exact analysis. It probably includes not only the dextrose release factor, but other factors such as flake density and physical characteristics of the flake not readily demonstrable in a three dimentional chart. As seen in the curve of FIG. 3, a 30 p.s.i. increase in cooking pressure, the atmospheric cooking pressure (zero on the chart) increases the percent by about four percent, whereas the same 30 p.s.i. increase in cooking pressure above 30 p.s.i.g. increases the percent digestability by about twelve percent. Thus, 30 p.s.i.g. increase represents three times the increase in ability attained by the first 30 p.s.i. increase in cooking pressure. The curve of FIG. 3 demonstrates further the benefication to be expected from utilization of the higher cooking pressures under the Hickey invention relative to the more general factor of percent digestability.

FIG. 4 shows the increase of digestability with increasing flake size at a selected cooking pressure.

The ordinate of FIG. 4 gives flake density in terms of pounds per cubic foot, the so-called bulk density. The density scale is inverted so that increasing flake size runs upwardly of the ordinate. As mentioned, the density-flake size relation is non-linear but three flake sizes in terms percent by weight of flakes larger than a 5 mesh screen are indicated on the curve of FIG. 4 by way of example. The higher this percent, the larger the flakes, but no definite relation between flake size and bulk density can be given because this depends on a number of factors including those relating to the nature of the grain itself. FIG. 4 reveals that with grain cooked at a highly effective cooking pressure for dextrose release, 60 p.s.i.g., flake density has a marked effect on percent digestability, Although in the feed trials shown in FIG. 4 about 70 percent digestability is attained with a 30 pound per cubic foot flake (see also FIG. 3), if the flake density is permitted to rise to 45 pounds per cubic foot, the percent digestability drops to 55. Thus, even if grain is cooked at what could be expected to be a highly beneficial pressure, namely 60 p.s.i.g., the benefits are lost if rolling the grain results in a high flake density. As shown in FIG. 4, the percent digestability at a flake density of 45 is no better than that obtainable from a 30 pound per cubic foot product steamed at atmospheric pressure (zero pressure on FIG. 3). Thus, the curves described so far show that increased cooking improves digestability and dextrose release, but that the rolling of such grain increases flake density and hence decreases flake size, which tends to offset the essential benefication attainable from the Hickey process.

The curves of FIGS. 5 and 6 introduce some of the physical problems of producing low flake densities (large flakes) at selected cooking pressures at conditions under which a commercial rolling mill must operate. FIG. 5 shows that there is a decrease in rolling tonnage with an increase in cooking pressure at a given flake density of about 32 pounds per cubic foot. This flake density is higher than that now considered to be the most desirable density for practice of the Hickey invention, but it is a density commonly encountered in the field. The ordinate of FIG. 5 gives tons of grain rolled per hour, the preferred commercial operating zone being 4 tons per hour or more. It is shown that grain cooked at 30 p.s.i.g. and rolled hot (170 degrees F. or higher) can be rolled at tonnages within the commercial operating zone. However, if the grain is cooked at a 60 p.s.i.g. process pressure and rolled to the same flake density of about 32, (and hence is much superior in dextrose release and percent digestability), only 1½ tons per hour of these flakes can be rolled.

Accepting the fact that we wish to flake at least four tons per hour and using that tonnage as an example, FIG. 6 shows a corollary of the rolling problem indicated in FIG. 5, rolling the cooked milo without cooling. When 60 p.s.i.g. processed milo is rolled at the four ton rate without cooling (170 degrees F. or higher) the resultant flake density is 45. This gives a percent digestability of only 55 (FIG. 4), which is little better than that attainable when feeding milo cooked at atmospheric pressure (FIG. 3).

Rolling milo cooked at 30 p.s.i.g. (and uncooled) provides a flake density of 30, but this provides only a 4 percent increase in digestability (FIG. 3) over that attainable by processing the grain at atmospheric pressure. Thus, in high tonnage rolling, little has been gained by increasing the pressure in the cooking vessel above atmosphere, and it must be remembered that when the cooking pressure is increased, the equipment must be designed to handle super atmospheric steam pressures.

To summarize, it has been shown that the cooking pressures in the order of 60 p.s.i.g. are beneficial in both dextrose release and in percent of digestability (FIGS. 1 to 3), providing a relatively low flake density can also be attained upon rolling (FIG. 4). However, cooking at 60 p.s.i.g. and rolling the cooked cereal without cooling so as to provide a relatively low-flake density, does not permit commercially acceptable tonnage from the rolls (FIG. 5). Conversely rolling 60 p.s.i.g. processed cereal at the commercial rate of four tons per hour produces an unacceptably high flake density (FIG. 6).

As mentioned, heretofore incompatible factors of dextrose release, cooking pressure, flake density and rolling are partially resolved by cooling the cooked grain before rolling and the effects of this improvement are shown in FIG. 7.

FIG. 7 is a curve showing the effect of rolling temperature on the flake size of milo cooked at 50 p.s.i.g. for 50 seconds. In these tests no additional moisture was added to the grain during the process, there was no moisture control like that of the present invention. As can be seen from the curve of FIG. 7, as the rolling temperature of the grain was decreased from 190 degrees (representing the maximum practical rolling temperature), the flake size in terms of percent by weight of flakes larger than a five mesh screen increases progressively. If the grain could be cooled and rolled at about 143° F. a maximum percentage of the resulting flakes would be larger than a five mesh screen. These would be the "best flakes."

Continuing on down the cooling range from the 143 degree zone, it can be seen in FIG. 7 that the flakes become progressively smaller and more dense. The curve ends at about 110 degrees F., because pulverization and the production of fines is excessive-flaking ends (practically) before this temperature is reached on the scale. Thus, at about 143 degrees F. there is a peak in the curve and cooling the grains for rolling at about 140 degrees will produce some optimum percentage of flakes larger than a 5 mesh screen, namely about 72 percent in the example given. The temperature line T falling at 143 degrees in FIG. 7 can be considered to represent the dividing line between the predominance of two product properties, both of which are undesirable. As the rolling temperature is increased above the 143 degree line T, the material being rolled takes on an increasing rubbery characteristic. The rubbery nature of the material is undesirable in that it both limits the rolling tonnage attainable, and requires large rolling motor current consumption, but even so the flakes thus produced are not the best obtainable. If the grain is cooled below 143 degrees the properties of the rolled material gradually deteriorates, there is an increase in the number of fines and there is a pulverizing effect on the grain. As is mentioned, it is not ordinarily possible to roll at 110 degrees or below, because at these temperatures the material pulverizes. Thus, in order to attain the full advantage of the Hickey invention by simply cooling as shown in FIG. 7, careful attention must be paid to the cooling operation, and only by rolling at the optimum temperature of about 143 degrees F. will the best flakes be provided.

FIG. 8 shows how both cooling and the use of moisture control under the present invention makes possible the rolling of even better flakes than are attainable simply by cooling. Here, milo cooked at 50 p.s.i.g. for 50 seconds had moisture added thereto in accordance with the present invention as the raw grain was introduced into the steamer. The steamed milo with moisture added to provide moisture control was cooled to various temperatures before rolling, through a temperature of 143 degrees F., although its rolling temperature is preferably lower. As a matter of fact, using moisture control, the milo can be cooled down to 90 degrees F. or even lower, with a progressive increase in flake quality down to 90 degrees F. That is, the flakes are larger and the flake density less as the cooling process is carried out up until a maximum optimum rolling temperature of about 90 degrees F. The optimum flake conditions obtained by rolling at 90 degrees F. can be regarded as corresponding to the optimum flake conditions attainable at 143 degrees F. when the milo cooled without moisture control as illustrated in the curve of FIG. 7.

This ability to cool the milo below 143 degrees F. and even down to 90 degrees F. (or lower if desired) is made possible by adjusting the rate of moisture addition to the milo as it enters the steamer. To obtain the best flakes at a selected rolling temperature, the amount of moisture added will be adjusted so that the moisture content of the grain before rolling will be between about 17 and 22 percent by weight.

Although the final moisture content of the grain just before rolling under the present invention should be substantially in the 17 to 22 percent range just described, this does not mean that the amount of water added to the grain initially will always be the same. The various factors which determine the final moisture content of grain steamed and cooled to a given temperature have been previously described. Although laboratory tests could be run to determine the moisture content of the grain at any given temperature, experience in the field shows this to be unnecessary. Mill operators soon know by the appearance and feel of flakes coming off the mill what the moisture content is. At one extreme, at the wet end, the material will sheet instead of flake and this indicates extreme over-wetness. In fact, sheeting is to be prohibited in that it results in jamming of the mill. On the other hand, where insufficient moisture has been added, the flakes will become small and the percentage of fines increased. The rolling action will be more of a pulverization than flaking action, as previously described. This indicates that insufficient moisture has been added to the grain at the entrance to the steamer. In most cases, however, flakes will be produced and the miller, based upon his experience can readily estimate the moisture content of the flakes. If he has not had such experience the moisture content can be determined for future guidance by running a series of laboratory tests on actual flakes, but the particular rolling cannot be interrupted awaiting a lab report. As a practical matter, all that is required for the miller to practice the present invention is that at whatever cooling temperature he selects at 143 degrees F. or below, the valve admitting the water to the grain for moisture control be opened or closed until observation of the flakes indicates that they are as desired from experience, and the grain producing these flakes will have had the 17 to 22 percent moisture content just before entering the rollers, in accordance with the present invention.

FIG. 8 also has a point showing the flake size of milo cooked at 30 p.s.i.g. although these flakes have an excellent appearance, their nutritional value in terms of dextrose release is not as good as that of flakes processed under the Hickey invention, namely 40 p.s.i.g. or higher.

To summarize the test data presented herein, the curves of FIGS. 1 to 4 show that there is a definite nutritional gain in terms of dextrose release and digestability using a cooking pressure of 40 p.s.i.g. or higher, and that large flakes are also desirable. FIGS. 5 and 6 show rolling problems encountered with grain processed at 60 p.s.i.g. and rolled hot. FIG. 7 shows how the advantages of cooling the cooked grain before rolling, using no moisture control, are limited. It has also been explained that although large, light weight flakes are readily obtainable when the milo is cooked at pressures lower than those recommended by the Hickey invention (such as at 30 p.s.i.g.) it has been difficult heretofore to roll flakes having these physical properties using higher cooking-pressures under the Hickey invention. Even, if mere physical appearance and size of the flakes is to be judged as a criterion in operation of the mill (without knowledge of dextrose release improvements), FIG. 8 shows that by merely cooling the grain down to about 110 degrees F. and adjusting the moisture of the grain to about 17-22 percent, produces flakes that equal in appearance those attainable by rolling milo cooked at 30 p.s.i.g. Also, with moisture control the rolling water content can be adjusted so as to permit cooling below 110 degrees F., say down to 90 degrees F. whereupon flakes having superior physical and appearance properties to those of milo cooked at 30 p.s.i.g. are produced. The lower cooling ranges made possible by moisture control under the present invention also facilitate higher rolling tonnage as well as reducing current to the rolling motors, with a corresponding decrease in processing cost. As to the best rolling moisture content, within the limits of experimental error of plus or minus 1 percent, a moisture content of 18 percent is believed to provide optimum results.

Thus, it can be seen that by simply adding moisture to the raw grain regardless of the initial condition of the grain, and by adding the water at a point in the process wherein steaming will drive the moisture through, and into and through the grain body, the advantages of the Hickey invention attained by cooking at pressures of 40 p.s.i.g. or higher are attainable, provided a cooler is used to cool the grain down to a temperature of 143 degrees F., or lower, preferably to a temperature in the order of 90 to 110 degrees F. As a matter of fact, the grain can be processed at temperatures lower than 90 degrees if the moisture content is held at 17 percent or higher, in accordance with the present invention.

The number of variables in cattle feed preparation is so large, and the precise measurement of the results so difficult, that the presentation of numerous examples would be of no more assistance to those practicing the invention than the data just given. Hence two examples are presented.

Furthermore, the grain will lose moisture and heat in travel between the cooker and roller, which is extreme in an actual installation (FIG. 10). The loss of moisture usually corresponds to the loss of temperature. Since the object of rolling is to produce the flattest flakes, it is desired to optimize moisture and temperature independently. Without adding water before the cooker, any decrease in temperature before rolling will result in an uncontrolled loss of moisture.

EXAMPLE I

Milo at normal moisture content and ambient room temperature was steamed for 50 seconds at 50 p.s.i.g. The cooked grain was air cooled to provide a rolling temperature of 110 degrees F. Sufficient water was added to the raw grain just before cooking (outside of the cooker) to bring the moisture content of the cooked grain to 17 percent by weight, at the rolls. The flakes were large and light so that 86 percent of the flakes (by weight) were larger than a 5 mesh screen. These were excellent flakes from a physical appearance standpoint, and it is known that flakes of this appearance have a high percent digestability (FIG. 4) and a high rate of dextrose release (FIG. 1). If water had not been added, the grain would be dried to less than 15 percent moisture and the resultant rolled product would contain excessive small fractured particles.

EXAMPLE II

The milo was processed in accordance with Ebample I, except that the cooked grain was cooled to a 114 degree F. rolling temperature and the moisture control adjustment made to provide cooked grain at 19 percent moisture for rolling. In this example, 81 percent of the flakes (by weight) were larger than a 5 mesh screen.

The moisture content percentages given herein are on a wet basis. The steam entering the cooker is saturated.

DESCRIPTION OF THE EQUIPMENT

FIG. 10 is a section through a grain feeding system and a cooker embodying the present invention. Except for the provision of means for admitting water to the whole grain before cooking, in order to attain moisture control under the present invention, the cooker 10 is a commercial machine known as a Continuous High Pressure Steamer, sold by applicant's assignee to the industry under that designation. The steamer, or cooker 10, is about twenty feet long and has a capacity of approximately 36,000 pounds per hour of milo, under continuous operation.

The cooker (FIG. 9) has a housing 12 within which turns a conveyor screw 14 operated at a selected conveyor speed by an electric motor 16 and a drive 18. A pressure sealing inlet valve 20 of a design known in the industry is provided, having a rotor 22 for feeding grain into the cooker while the housing 12 is under steam pressure. The valve 20 is pressurized by a steam line 24 and is vented by vent line 26. The valve rotor 22 is rotated at a speed which accommodates the maximum feeding rate by a fixed speed drive 28 of conventional design illustrated diagrammatically. An outlet valve 30 which is a substantial duplicate of the inlet valve 28 is also provided in accordance with the practice conventional in this art.

Steam under pressure is generated in a boiler (not shown) and directed to the cooker 10 by a line 32. A steam pressure controller 34 is fitted to the line 32 for admitting steam to the cooker by a line 36 at a selected pressure. The pressure controller 34 is a commercial unit, the details of which are not critical to the present invention. The pressure of the steam admitted to the cooker by line 36 will be 40 p.s.i.g. or higher, as has been previously explained.

Whole grain is fed continuously to the cooker 10 by the conveyor screw 36. In order to thus feed the grain, a hopper 34 receives a whole grain and feeds it to a feed screw 36 driven by a variable speed drive 38 of conventional design, the details of which are not critical to the present invention. Grain from the conveyor 36 falls through an inlet tube 40 and into an inlet hopper 42 of the inlet valve 20. It is at the hopper 42 that water is added to the grain to provide the moisture control of the present invention, so that the grain will have a moisture content of 17 to 22 percent at the rolling mill.

In order to provide the required additional moisture under the present invention, a water line 44 is connected to a water main and a water pressure regulator 46 delivers water at constant pressure to a supply line 48. The provision of constant pressure is necessary in order that the water admission can be adjusted to provide and maintain the desired moisture control while the grain is being processed through the system at a selected rate.

In order to adjust the amount of water added from the line 48, a flow control needle valve 50 is provided, which is in a position so that it can be readily manipulated by the mill operator based upon his observations of the quality of the flakes emerging from the rolling mill. Thus, a predetermined quantity of water flows through the needle valve 50 and enters the inlet valve hopper 42 via the water admission pipe 52.

Once the tonnage through-put system is determined, the feed screw 36 drive speed is adjusted accordingly, and steam at the selected cooking pressure is introduced through the pipe 32 to the cooker. As explained previously, the adjustment of the needle valve 50 for the water admission pipe 52 is determined by observations made of the flakes emerging from the rolling mills, or, if possible, by measurements of the water content of the cooked grain entering the rolling mill.

A typical mill using the cooker just described and set up for practicing the present invention is shown in the diagram of FIG. 10. The cooker 10 and associated equipment shown in FIG. 9 appears in simplified form in FIG. 10 and the description thereof will not be repeated. The cooked grain leaves the cooker discharge valve 30 and is conveyed by a screw conveyor 56 to a hopper elevator conveyor 58 which drops the cooked grain through a discharge spout 59 into a cooked grain cooler 60. It is the purpose of the cooked grain to cool to an extent whereby the grain entering the rolling mill will at a rolling temperature of about 143 degrees F. or lower, 90 degrees F. being the preferred lower temperature. The cooled grain leaving the cooler 60 is conveyed by a screw conveyor 62 to an elevator hopper conveyor 64, which discharges the grain through a discharge duct 66 to a horizontal rolling mill feeder conveyor 68. The feeder conveyor 68 feeds one or more rolling mills 70, only one mill appearing in FIG. 10. The cooked and cooled grain is dropped by the horizontal feeder conveyor 68 into a vertical delivery pipe 72, and hence passes between the rolls 74 of the rolling mill. The rolls 74 are illustrated diagrammatically, and the manner of feeding the grain to the rolls and the manner of driving the rolls is not illustrated, these being well known techniques and conventional features of presently employed apparatus. The rolled flakes are discharged from the rolls 74 of the rolling mill and are carried away to storage by a screw conveyor 76.

Referring to the grain cooler 60 in more detail, this cooler is designed to move a column of cooked grain downwardly at the selected through-put of the system, while exposing the grain to a draft of ambient cooling air. The details of the cooler are not critical to the present invention and the cooler shown is of commercial design such as the Pellet Cooler, manufactured by the California Pellet Mill Company of San Francisco, Calif. The cooler has a grain receiving hopper 80 for receiving grain from the discharge spout 59 of the elevator 58. Two vertical columns of the grain descend through the cooler at a controlled rate down through the cooler, at a rate being controlled by a rotary discharge gate 82 at the bottom of the device in response to the level of the material in the hopper 80. Cooling air is drawn through the descending column or bed of cooked grain by a variable speed fan 86 which draws air (dotted arrows) through louvers 88 on each side of the cooler, through the vertically descending columns of grain in the coolers, and out through an air exhaust duct 90 to a dust collector cyclone, not shown. The fan 86 is driven by a variable speed drive in any conventional manner such as by a variable speed motor 92, although variable speed drives or transmissions in the drive to the fan 86 can also be used under the present invention. The rotary discharge gate 82 is also driven by a variable speed by means not shown, in order to synchronize the flow of grain through the cooler 60 with the flow thereof through the cooker and other devices in the system, including the rolling mills 70.

In operation, whole raw grain such as milo is introduced into the hopper 34. The moisture of this grain will be what is called normal moisture content, which will be in the order of 9 to 13 percent, but may be lower in dry climates.

The raw grain is carried down to the hopper 42 of the inlet valve 20 where water is supplied by admission pipe 52 and the adjustable valve 50, in accordance with the present invention. Steam is supplied to the cooker 10 at a selected pressure, such as 40 p.s.i.g. or higher, and the screw 14 of the cooker is adjusted to convey the grain through the cooker at a rate which provides a selected residence time, in the order of 50 seconds or more. Cooked grain is discharged from the cooker by the discharge valve 30 and conveyed by the screw conveyor 56 and hopper conveyor 58 to the grain cooler 60. In the cooker, the moisture added from pipe 52 and that condensed from the steam is driven through the mills completely into the starch body, right to the core of each starch body. This cooks the grain and its starch for facilitating enzymatic release of dextrose under the Hickey invention.

At the cooler 60, the variable speed fan 86 draws ambient air through the cooler to cool the grain down to an extent whereby it will be at the selected temperature at the rolling mill. The grain thus cooled is conveyed by conveyors 62, 64 and 68 to the rolling mill 70, as described. The mill operator, by observing the condition, properties, and nature of the flakes emerging from the rolls 74 determines whether or not the flakes appear to have satisfactory physical properties, based upon his experience. If the cooked grain passing through the rolls 74 appears to be too gummy or rubbery, it will sheet out. This indicates that at the rolling temperature employed, too much moisture is being added to the grain through the moisture control system pipe 52. Hence, the needle valve 50 of the moisture control system will be closed down by the mill operator, and the mill observed to see that good flakes are produced.

If the flakes emerging from the rolls 74 of the rolling mill are not satisfactory in the sense that they are too small, or not flat enough, or include too many fines, this indicates that not enough water has been added via the admission pipe 52 and the needle valve 50 will be opened. Of course, there will be some time lag between the adjustment of the needle valve 50 and the corresponding improvement in the quality of the flakes, but in a relatively inexact process such as this wherein even the nature of the starting material itself is quite variable, this initial adjustment and time lag are inescapable.

As previously mentioned, although most rolling mill operators can estimate the required adjustment to the water admission valve 50 based upon observation of the flakes and translation of this (if necessary), into percent moisture content of the flakes. It is possible, of course, to make a laboratory determination of the moisture content of the cooked grain, in order to bring it to the desired range of about 17 to 22 percent moisture by weight.

The degree to which the grain is cooled can also be controlled by adjustment of the speed of the variable speed in fan 86 in the cooler 60. There are a number of factors which will determine the speed of operation of this fan, including the through-put tonnage, and the cooling effect of the conveying system between the cooler and the rolling mill, and, of course, the desired temperature of the grain at the rolling mill.

In accordance with the present invention, the temperature at the rolling mill will have a maximum of about 143 degrees F., and will preferably be lower, a rolling temperature of 90 degrees being the preferred temperature. However, substantial improvements are available in the range of from about 143 degrees F. to 90 degrees F. The curve of FIG. 8 also shows that the grain can be cooled to a temperature below 90 degrees although nothing is to be gained by this additional cooling. However, in cold climates, or where the path of the grain between the cooler and the rolling mills is long, the grain temperature may drop to ambient temperature before rolling. However, as previously mentioned, too low a rolling temperature will result in an excess of production of fines and in brittle flakes, indicating either that the temperature of the grain should be raised by adjusting the variable speed fan 86, or that more water should be added to the grain to bring its moisture content at the rolls to about 17 percent to 22 percent by weight, with 18 percent being the preferred moisture content for rolling.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a continuous process for preparing raw cereal grain for use as animal feed of the type comprising the steps of continuously feeding the raw grain, continuously subjecting raw grain to steam at a pressure at about 40 p.s.i.g. or higher for a time long enough to cook the grain and dextrinize the starch, cooling the cooked grain, and directly rolling the cooked and cooled grain to provide flakes; the improvement comprising continuously adding water to the grain as the grain is being fed and before it is cooked so that the freshly added water is driven into the grain during the cooking step, cooling the cooked grain without drying it to a rolling temperature in the range from about 143° F. to ambient temperature, and controlling the rate of water addition to the uncooked grain to provide a moisture content in the range of from about 17% to 22% by weight in the cooked, cooled and unrolled grain at said rolling temperature.

2. The process of claim 1, wherein said rolling temperature is in the range of from about 110° F. to about 90° F.

3. The process of claim 2, wherein said moisture content at rolling is adjusted to 18% plus or minus 1%.

References Cited
UNITED STATES PATENTS

| | | | |
|---|---|---|---|
| 1,321,754 | 11/1919 | Kellogg | 99—81 |
| 1,750,508 | 3/1930 | Cornelius | 99—80 |
| 2,928,743 | 3/1960 | Rutgers | 99—80 |
| 3,181,955 | 5/1965 | Altman | 99—80 |
| 3,336,137 | 8/1967 | Hickey | 99—2 |

LIONEL M. SHAPIRO, Primary Examiner

J. R. HOFFMAN, Assistant Examiner

U.S. Cl. X.R.

99—80